United States Patent
Nguyen et al.

(10) Patent No.: US 9,231,731 B1
(45) Date of Patent: Jan. 5, 2016

(54) COMMON MODE CALIBRATION

(71) Applicant: Rambus Inc., Sunnyvale, CA (US)

(72) Inventors: Huy M. Nguyen, San Jose, CA (US); Kambiz Kaviani, Palo Alto, CA (US); Reza Navid, San Francisco, CA (US); Jason Chia-Jen Wei, San Jose, CA (US); Xudong Shi, Sunnyvale, CA (US); Scott C. Best, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 91 days.

(21) Appl. No.: 13/857,329

(22) Filed: Apr. 5, 2013

Related U.S. Application Data

(60) Provisional application No. 61/621,239, filed on Apr. 6, 2012.

(51) Int. Cl.
*H03K 19/094* (2006.01)
*H04L 1/00* (2006.01)

(52) U.S. Cl.
CPC .................................... *H04L 1/0036* (2013.01)

(58) Field of Classification Search
None
See application file for complete search history.

(56) References Cited

U.S. PATENT DOCUMENTS

| | | | | |
|---|---|---|---|---|
| 6,654,462 B1 * | 11/2003 | Hedberg | .................. | 379/399.01 |
| 7,843,212 B2 * | 11/2010 | Tanaka | ............................ | 326/30 |
| 8,022,728 B2 * | 9/2011 | Kanda et al. | .................... | 326/83 |

* cited by examiner

*Primary Examiner* — Anh Tran
(74) *Attorney, Agent, or Firm* — The Neudeck Law Firm, LLC

(57) ABSTRACT

The common-mode input voltage of a common-gate input amplifier receiving a differential signal is set in an open-loop manner by basing the bias current and/or source load impedances of the common-gate amplifier on a transmitter bias current and driving impedance. The common-mode input voltage of a common-gate input amplifier receiving a differential signal may be set in a closed-loop manner using a feedback loop having a captured target voltage compared to the common-mode input voltage at a node of the amplifier. The common-mode input voltage of a common-gate input amplifier receiving a differential signal may be set in a continuous time closed loop manner by sending a reference current through resistances that are multiples of a resistance used to generate the reference current.

16 Claims, 11 Drawing Sheets

COMMON MODE CALIBRATION

DETAILED DESCRIPTION

Figure 1:
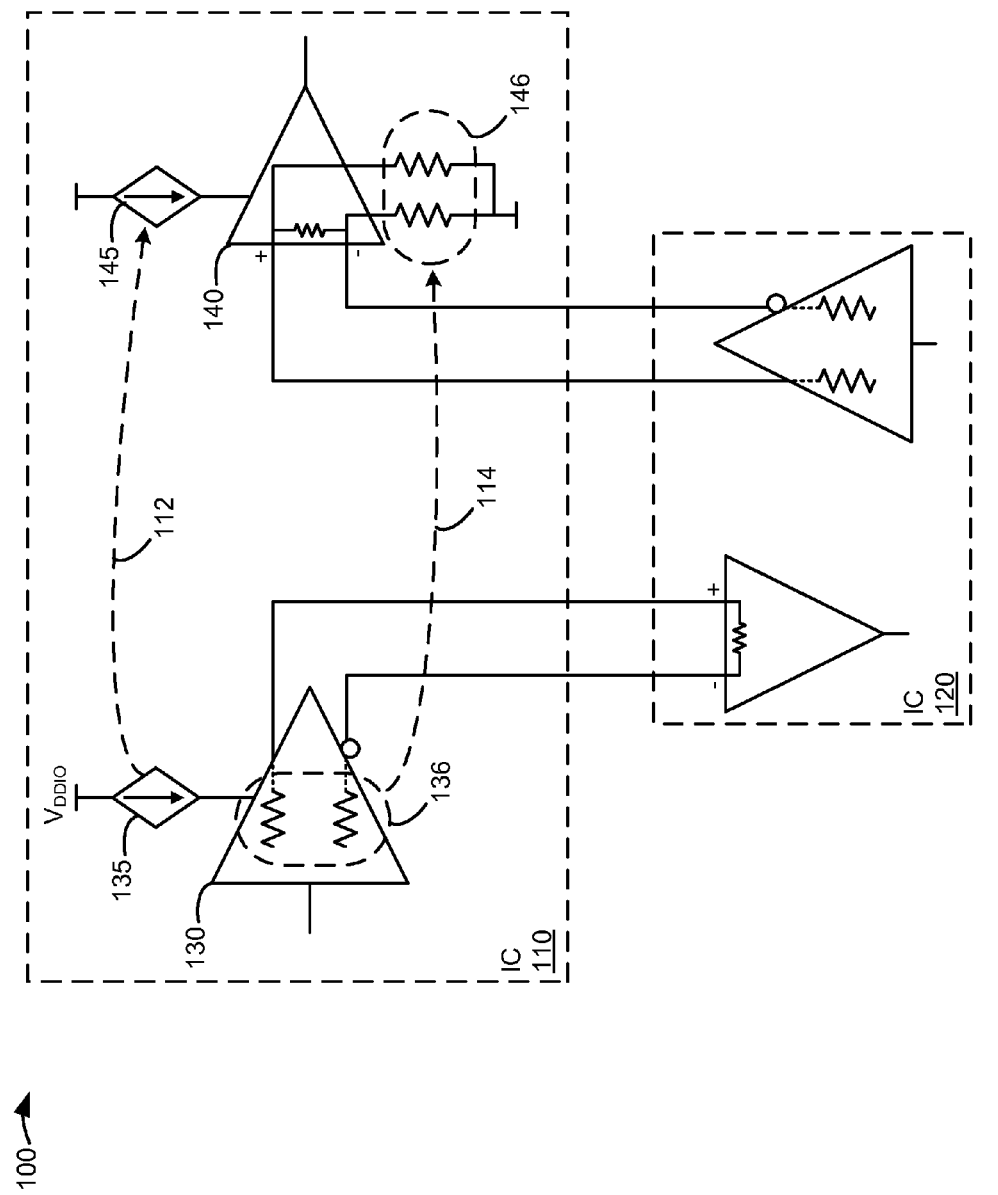
FIG. 1 is an illustration of an open-loop system for common-mode calibration.

Mismatches between the common-mode voltage output by a transmitter and the common-mode voltage of the input of a common-gate amplifier receiving data sent by the transmitter can cause errors in the received data. In addition, these mismatches can cause significant direct current (DC) power consumption as the common-mode voltage output by the transmitter "fights" with the common-mode voltage driven by the common-gate amplifier at the input of the amplifier. A mismatch that causes as little as 0.5 mA DC power consumption per transmitter/amplifier pair can add up to over 0.26 A for a 512-bit (or 64 byte) interface.

In an embodiment, the common-mode input voltage of a common-gate input amplifier is set by adjusting the bias current and/or source load impedances of the common-gate amplifier based on a transmitter bias current and driving impedance. In other words, the output impedance and drive current of a transmitter can be calibrated such that the transmitter outputs a specified voltage swing at a specified common-mode voltage. For example, a drive current and drive impedance of a transmitter may be calibrated over process, voltage, and temperature (PVT) such that the transmitter will output signals compatible with low-voltage differential signaling (LVDS) or some other signaling scheme. The calibrated drive current and the calibrated drive impedances of the transmitter are used as the basis for a bias current and the source load impedances of a common-gate amplifier such that the input common-mode voltage of the amplifier approximates the common-mode voltage output by the transmitter.

In an embodiment, a target voltage is based on a received voltage, received data, a reference voltage, a voltage of a transmitter, or some other indicator of the common-mode voltage being output by the transmitter coupled to a receiver. The target voltage is used as the control voltage of a feedback loop. The feedback voltage of the feedback loop is derived from a node of the common-gate amplifier that corresponds to the common-mode voltage of the amplifier. The feedback loop may adjust a bias current of the amplifier, the source load resistances of the amplifier, or both, in order to match the feedback voltage to the target voltage.

In an embodiment, a reference current is generated based on the power supply voltage associated with a transmitter (e.g., $V_{DDIO}$) coupled to the amplifier and a first multiple of a selected source load impedance (e.g., $4*R_{load}$). The reference current is replicated by a first current mirror. The mirrored current is directed through a diode-connected transistor and an impedance that is a second multiple of the selected source load impedance (e.g., $3*R_{load}$). This generates a voltage at the gate of the diode-connected transistor that is used to bias the gates of the common-gate amplifier such that the common-mode voltage of the amplifier is the power supply voltage of the transmitter times the ratio of the second multiple divided by the first multiple (e.g., $\frac{3}{4}*V_{DDIO}$).

FIG. 1 is an illustration of an open-loop system for common-mode calibration. In FIG. 1, communication system 100 comprises integrated circuit (IC) 110 and integrated circuit 120. Integrated circuit 110 includes transmitter 130, calibrated current source 135, receiver 140, bias current source 145, and impedances 146. Transmitter 130 includes transmitter impedances 136. Integrated circuit 120 includes a transmitter and receiver coupled to receiver 140 and transmitter 130, respectively.

In an embodiment, calibrated current source 135 determines a drive current of transmitter 130. Impedances 136 determine an output impedance of transmitter 130. The amount of current flowing through calibrated current source 135 is routed by transmitter 130 through impedances 136 such that the common-mode voltage output by transmitter 130 is determined by calibrated current source 135 and impedances 136. Impedances 136 are typically designed and calibrated to match or closely approximate each other.

Calibrated current source 135 and impedances 136 are calibrated such that transmitter 130 outputs a specified voltage swing at a specified common-mode voltage. For example, calibrated current source 135 and impedances 136 may be configured and calibrated so that transmitter 130 outputs a common-mode voltage and voltage swings compatible with Near Ground Signaling (NGS), Low Voltage Differential Signaling (LVDS), Pseudo Open Drain Logic (PODL) signaling, Differential Rambus Signaling Level (DRSL), and/or Series Stub Terminated Logic (SSTL), Double Data Rate type four (DDR4) signaling, Double Data Rate type five (DDR5) signaling, Graphics Double Data Rate type four (GDDR4) signaling, Graphics Double Data Rate type seven (GDDR7) signaling, Low Power Double Data Rate type three (LPDDR3) signaling, Low Power Double Data Rate type four (LPDDR4) signaling and/or eXtreme Data Rate (XDR) signaling. Likewise, amplifier 140 may be configured to receive any one or more of these, or other, signaling technologies.

Bias current source 145 determines a current flowing in amplifier 140 and a current flowing in impedances 146. The average current flowing though impedances 146 determines the voltage swing seen at the differential input of amplifier 140. The average of the differential input signals to amplifier 140 approximate the common-mode of the input signal to amplifier 140.

In an embodiment, the amount of current flowing through calibrated current source 135 is replicated, or approximated, by bias current source 145. This is illustrated in FIG. 1 by arrow 112. The amount of current flowing through calibrated current source 135 can be replicated by bias current source 145 using structural (e.g., physical design techniques that match components, and/or circuit techniques such as a current mirror) or digital means (e.g., digitally controlled current sources with the same control settings).

The impedances 136 are replicated, or approximated, by impedances 146. This is illustrated in FIG. 1 by arrow 114. Impedances 146 can replicate impedances 136 using structural (e.g., physical design techniques that match components, and/or circuit techniques such as a current mirror) or digital means (e.g., digitally controlled resistances with the same control settings or resistor digital-to-analog converters—RDACs—with the same control settings). Impedances 136 are typically designed and calibrated to match or closely approximate each other. Impedances 146 are typically designed and calibrated to match or closely approximate each other.

Calibrated current source 135 and impedances 136 determine voltage swing output by transmitter 130. The current flowing through bias current source 145 is a replica of the current flowing through calibrated current source 135, and impedances 146 are replicas of impedances 136. Thus, by Ohm's law, the common-mode voltage of amplifier 140 matches or approximates the common-mode voltage output by transmitter 130.

It should also be understood that by using Ohm's law, a one-to-one approximation at the receiver of the current flowing through calibrated current source 135 and impedances 136 is not necessary. As long as the product of impedances 136 and the current flowing through impedances 136 matches or approximates the product of impedances 146 and the current flowing through impedances 146, the common-mode voltage of amplifier 140 matches or approximates the common-mode voltage output by transmitter 130.

Figure 2:
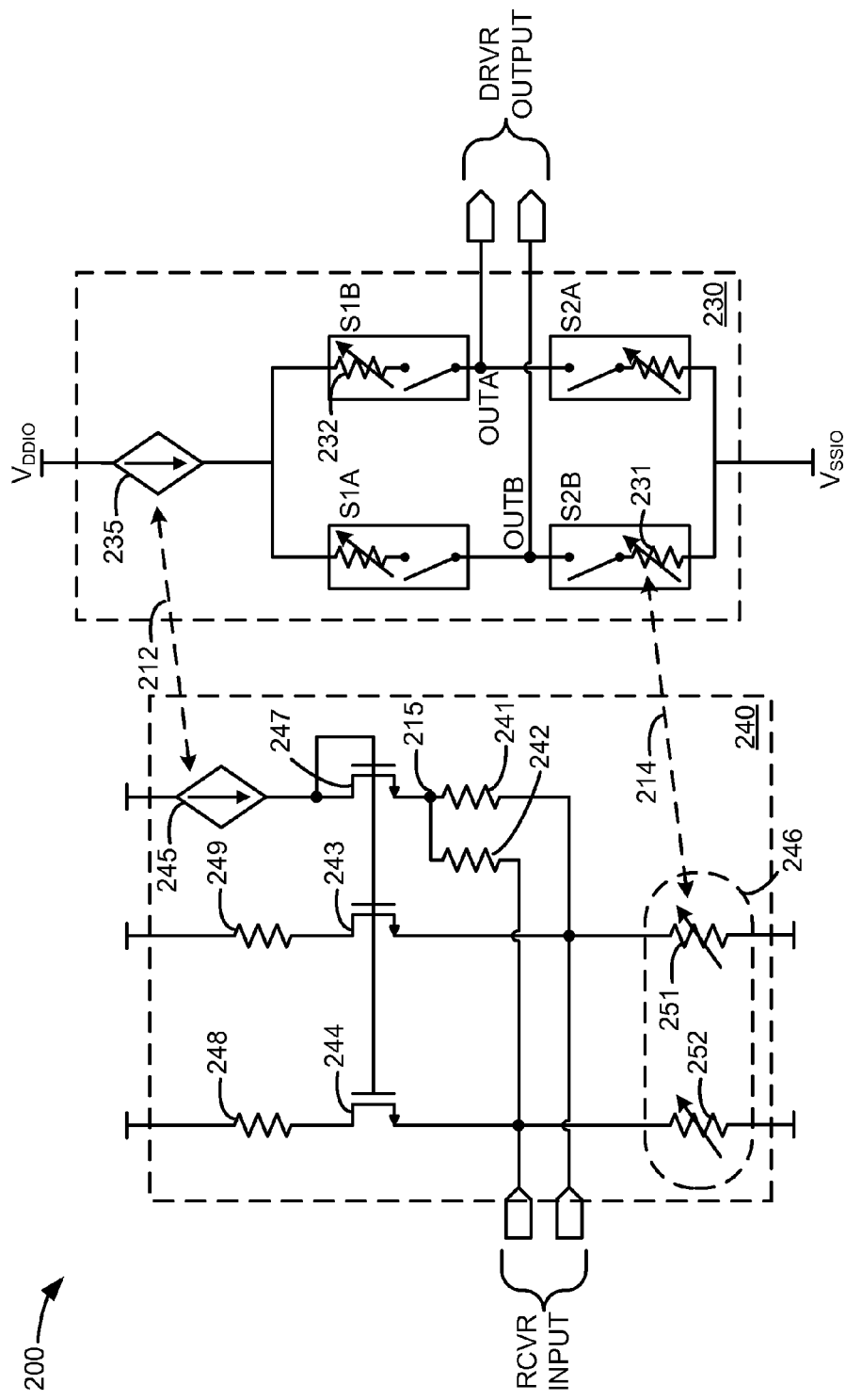
FIG. 2 is an illustration of an open-loop system for common-mode calibration.

FIG. 2 is an illustration of an open-loop system 200 including common-mode calibration. In FIG. 2, system 200 comprises driver 230 and receiver 240. Driver 230 comprises four switches—S1A, S1B, S2B, and S2A. Each of switches S1A, SIB, S2B, and S2A are represented by a controlled switch and an internal controlled impedance in series with the controlled switch. Switch S2B has a controlled impedance 231. Switch S1B has a controlled impedance 232. A first terminal of switch S1A and a first terminal of switch S1B are connected to receive a calibrated current from a positive supply terminal via a calibrated current source 235. The second terminal of switch S1B is connected to a first output terminal (OUTA) of driver 230. The second terminal of switch S1A is connected to a second output terminal (OUTB) of driver 230. A first terminal of switch S2B is connected to OUTB. A first terminal of switch S2A is connected to OUTA. The second terminals of switches S2B and S2A are connected to a negative power supply terminal of driver 230.

Receiver 240 comprises n-channel field effect transistors (FETs) 243, 244, and 247, a controlled current source 245, a resistor group 246, and resistors 241, 242, 248, and 249. Resistor group 246 includes a controlled resistor 251 and a controlled resistor 252. The input to receiver 240 is a differential signal applied between the source of FET 244 and the source of FET 243. The output of receiver 240 may be a differential voltage generated between the drains of FET 244 and FET 243.

A first terminal of resistor 248 is connected to the positive power supply terminal. A second terminal of resistor 248 is connected to the drain of FET 244. A first terminal of controlled resistor 252 is connected to the source of FET 244. A second terminal of controlled resistor 252 is connected to the negative power supply terminal. A first terminal of resistor 249 is connected to the positive power supply terminal. A second terminal of resistor 249 is connected to the drain of FET 243. A first terminal of controlled resistor 251 is connected to the source of FET 243. A second terminal of controlled resistor 251 is connected to the negative power supply terminal. The impedances of controlled resistor 251 and controlled resistor 252 are typically controlled in a manner that keeps them the same, or closely approximating each other.

A first terminal of resistor 241 is connected to the source of FET 243. A second terminal of resistor 241 is connected to the source of FET 247 (a.k.a. node 215). A first terminal of resistor 242 is connected to the source of FET 244. A second terminal of resistor 242 is connected to the source of FET 247. Thus, when resistor 241 and resistor 242 have the same value, the voltage on node 215 reflects the common-mode voltage of receiver 240. Typically, resistors 241 and 242 will have the same value. Resistors 241 and 242 can be controlled resistors that are calibrated to serve as on-die termination resistors.

The gate and drain of FET 247 are connected together, thereby forming a diode-connected FET. Controlled current source 245 is connected between the positive power supply terminal and the gate and drain of FET 247. The gate and drain of FET 247 are also connected to the gates of FET 244 and FET 243. Thus, the current flowing through controlled current source 245 determines the current flowing through FETs 243 and 244 in a current-mirror-like arrangement. It should be understood that receiver 240 comprises a common-gate type differential amplifier that amplifies the voltage differential at the receiver 240 input and outputs it at receiver 240's output between the drains of FET 243 and 244.

In an embodiment, calibrated current source 235 determines a drive current of driver 230. The controlled impedances of switches S1A, S1B, S2B, and S2A determine an output impedance of driver 230. At any given time, when driver 230 is active, two of switches S1A, S1B, S2B, and S2A are on, and two are off. For example, to drive a differential signal where the voltage on OUTA is greater than OUTB, S1B and S2B would be on, and S1A and S2A would be off. Thus, when driver 230 is active, the controlled impedances of only two of switches S1A, S1B, S2B, and S2A determine the output impedance of driver 230.

The current flowing through (and determined by) calibrated current source 235 is routed through the controlled impedances of switches S1A, SIB, S2B, and S2A such that the common-mode voltage output by driver 230 is determined by calibrated current source 235 and the controlled impedances of the two of switches S1A, SIB, S2B, and S2A that are on. Accordingly, the controlled impedances of switches S1A and S1B are designed and calibrated to match or closely approximate each other and the controlled impedances of switches S2A and S2B are designed and calibrated to match or closely approximate each other. This helps ensure that the common-mode voltage output by driver 230 is approximately the same for both driving states of driver 230 (i.e., the output common-mode voltage of driver 230 when the voltage at OUTA is greater than OUTB is equal to the output common-mode voltage of driver 230 when the voltage at OUTB is greater than OUTA).

Calibrated current source 235 and the controlled impedances of switches S1A, S1B, S2B, and S2A are calibrated such that driver 230 outputs a specified voltage swing at a specified common-mode voltage. For example, calibrated current source 235 and the controlled impedances of switches S1A, S1B, S2B, and S2A can be configured and calibrated so that driver 230 outputs a common-mode voltage and voltage swings compatible with one or more of the signaling technologies mentioned in the discussion of FIG. 1. Likewise, receiver 240 can be configured to receive any one or more of these, or other, signaling technologies.

Because of the current-mirror-like arrangement of FET 247 in relation to FETs 243 and 244, the current flowing through controlled current source 245 determines the current flowing through controlled resistor 251 and the current flowing through controlled resistor 252. The average currents flowing though controlled resistor 251 and controlled resistor 252 determine the common-mode voltage seen at the differential input of receiver 240.

In an embodiment, the amount of current flowing through calibrated current source 235 is replicated, or approximated, by controlled current source 245. This is illustrated in FIG. 2 by arrow 212. The amount of current flowing through calibrated current source 235 can be replicated by controlled current source 245 using structural (e.g., a current mirror) or digital means (e.g., digitally controlled current sources).

The controlled impedance of switch S2A (and thus, also S2B, S1A, or S1B) is replicated, or approximated, by controlled resistor 251 and controlled resistor 252. This is illustrated in FIG. 2 by arrow 214. Controlled resistor 251 and controlled resistor 252 can replicate the controlled impedance of switches S2A, S2B, S1A, and/or S1B using structural (e.g., physical design techniques that match components, and/or circuit techniques such as a current mirror) or digital means (e.g., digitally controlled resistances or an RDAC). One example of a matching technique would be to design controlled resistor 251 and controlled resistor 252 with a common (and optionally scaled) physical layout as the controlled impedance switches S2A, S2B, S1A, and/or S1B.

Calibrated current source 235 and the controlled impedances of switches S1A, S1B, S2B, and S2A determine the voltage swing output by driver 230. The current flowing through controlled current source 245 is a replica of the current flowing through calibrated current source 235. Controlled resistor 251 and controlled resistor 252 are replicas of controlled impedance 231. By appropriate selection of the size of FETs 243 and 244, the same current can be made to flow through controlled resistor 251 and controlled resistor 252 as flows through controlled impedance 231. Thus, by Ohm's law, the common-mode voltage of receiver 240 can be made to match or approximate the common-mode voltage output by driver 230. For example, assuming that the resistances of resistors 241 and 242 are small enough to be neglected, FETs 243 and 244 may be selected to be ½ the size of FET 247 in order to make the current that flows through controlled resistor 251 and controlled resistor 252 approximately the same as the current that flows through controlled impedance 231.

It should also be understood that a one-to-one approximation by controlled current source 245 and resistances 246 of the current flowing through calibrated current source 235 and impedance 231, respectively, is not necessary. As long as the products of the resistance of controlled resistor 251 and controlled resistor 252 and the average currents flowing through resistor 251 and controlled resistor 252, respectively, are selected to match or approximate the product of controlled impedance 231 and the current flowing through controlled impedance 231, the common-mode voltage of receiver 240 can be made to match or approximate the common-mode voltage output by driver 230.

In an example, to make the current flowing through resistors 241 and 242 small enough to be neglected, the current flowing through controlled current source 245 may be designed to be a replica that is a ratio of (i.e., some amount, x, times smaller) the current flowing through calibrated current source 235. By appropriate selection of the size of FETs 243 and 244 to be some ratio larger (i.e., some amount, y, times larger—where, for example, y>>x) than FET 247, the current source 245 flowing through resistors 241/242 and FET 247 can be neglected. The currents flowing through FET 243 and 244 multiplied with resistors 251 and 252, respectively, will be at approximately the same common-mode voltage as of driver 230. In another embodiment, resistors 251 and 252 can be some ratio larger (i.e., some amount, z, times larger) than the impedances of switches S2A and S2B. The selection of values for the variables x, y, and z may be made by one of ordinary skill in the art to achieve appropriate design objectives (e.g., accuracy of matching to the common-mode voltage output by driver 230 versus overall size/cost of the design).

Figure 3:
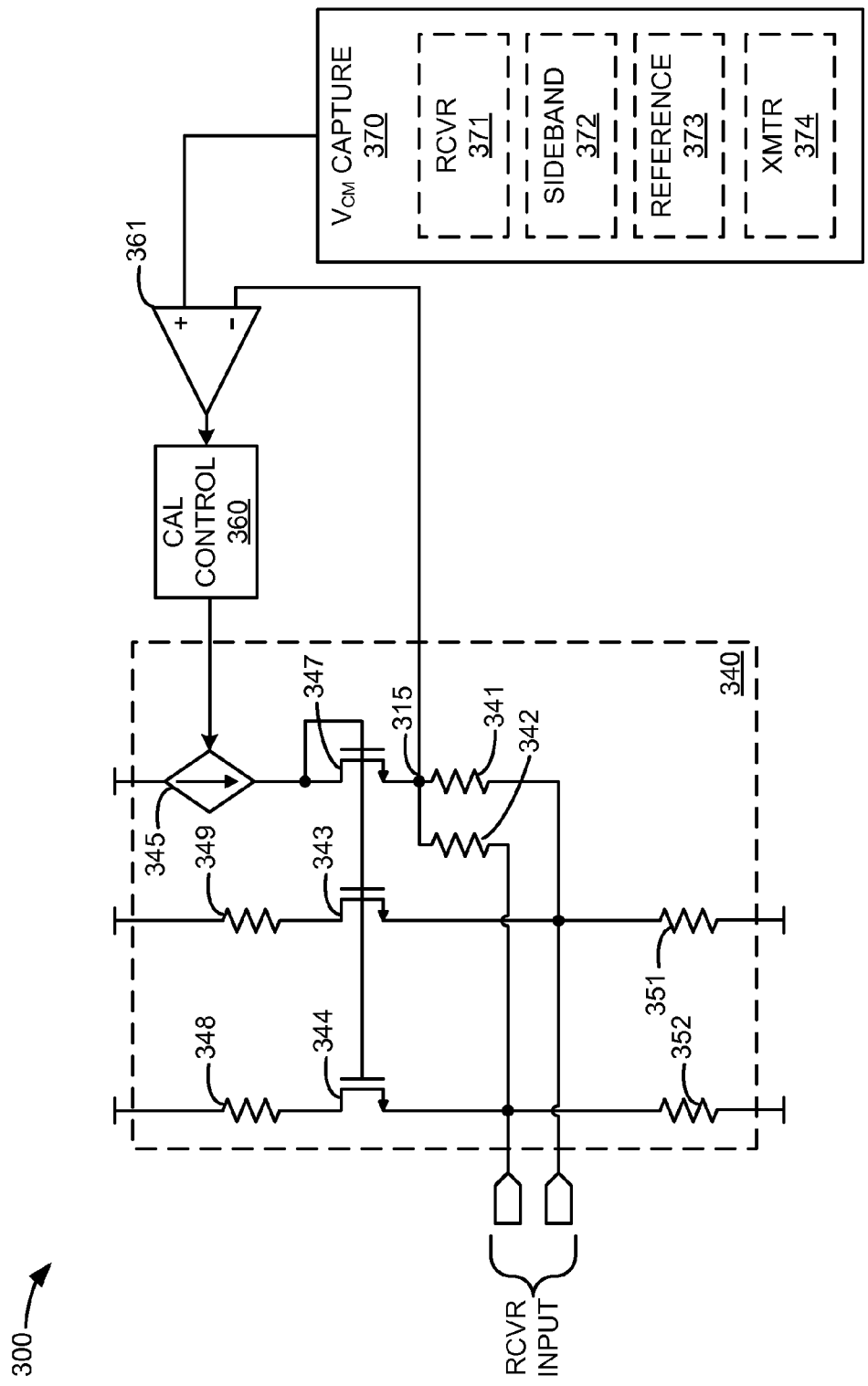
FIG. 3 is an illustration of a closed-loop system for common-mode calibration.

FIG. 3 is an illustration of a closed-loop system including common-mode calibration. In FIG. 3, closed-loop system 300 comprises a receiver 340, a calibration control 360, a comparator 361, and a $V_{CM}$ capture 370. Receiver 340 comprises FETs 343, 344, and 347, a controlled current source 345, and resistors 341, 342, 348, 349, 351, and 352. The input to receiver 340 is a differential voltage signal applied between the source of FET 344 and the source of FET 343. The output of receiver 340 can be a differential voltage generated between the drains of FETs 344 and 343. $V_{CM}$ capture 370 optionally includes a voltage receiver 371, a sideband interface 372, a voltage reference 373, or a transmitter 374.

A first terminal of resistor 348 is connected to a positive power supply terminal. A second terminal of resistor 348 is connected to the drain of FET 344. A first terminal of resistor 352 is connected to the source of FET 344. A second terminal of resistor 352 is connected to a negative power supply terminal. A first terminal of resistor 349 is connected to the positive power supply terminal. A second terminal of resistor 349 is connected to the drain of FET 343. A first terminal of resistor 351 is connected to the source of FET 343. A second terminal of resistor 351 is connected to the negative power supply terminal. The impedances of resistors 351 and 352 are typically the same, or closely approximate each other.

A first terminal of resistor 341 is connected to the source of FET 343. A second terminal of resistor 341 is connected to the source of FET 347. A first terminal of resistor 342 is connected to the source of FET 344. A second terminal of resistor 342 is connected to the source of FET 347 (a.k.a. node 315). Thus, when resistor 341 and resistor 342 have the same value, the average voltage on node 315 reflects the common-mode voltage of receiver 340. Typically, resistors 341 and 342 will have the same value. Resistors 341 and 342 may be controlled resistors that are calibrated to serve as on-die termination resistors.

Controlled current source 345 is connected between the positive power supply terminal and the gate and drain of FET 347. Controlled current source 345 is operatively coupled to calibration control 360. Calibration control 360 determines the current that flows through controlled current source 345. Calibration control 360 may determine the current that flows through controlled current source 345 using structural or digital means.

The gate and drain of FET 347 are connected together thereby forming a diode-connected FET. The gate and drain of FET 347 are also connected to the gates of FET 344 and FET 343. Thus, the current flowing through controlled current source 345 determines the current flowing through FETs 343 and 344 in a current-mirror-like arrangement. It should be understood that receiver 340 comprises a common-gate type differential amplifier that amplifies the voltage differential at the receiver 340 input and outputs it at receiver 340's output between the drains of FET 343 and 344. Receiver 340 can be configured to receive a common-mode voltage and voltage swings compatible with one or more of the signaling technologies mentioned in the discussion of FIG. 1.

Because of the current-mirror-like arrangement of FET 347 in relation to FETs 343 and 344, the current flowing through controlled current source 345 determines the current flowing through resistor 351 and the current flowing through resistor 352. The currents flowing though resistor 351 and resistor 352 determine the common-mode voltage seen at the differential input of receiver 340.

In an embodiment, $V_{CM}$ capture 370 outputs a target voltage. The target voltage is used as the control input of a feedback loop. The feedback voltage of the feedback loop is derived from node 315. It should be understood that node 315 corresponds to the common-mode voltage of receiver 315. Comparator 361 outputs a signal to calibration control 360 indicating whether node 315 is at a higher or lower voltage than the target voltage output by $V_{CM}$ capture 370. Calibration control 360 controls controlled current source 345. Calibration control 360 uses the signal received from comparator 361 to determine whether to decrease or increase the current flowing through controlled current source 345. These adjustments to controlled current source 345 cause the voltage on node 315 to stabilize at or near the target voltage output by $V_{CM}$ capture 370.

For example, if node 315 is lower than the target voltage, comparator 361 will indicate this to calibration control 360. In response, calibration control 360 will increase the current flowing through controlled current source 345. The increased current through controlled current source 345 increases the current flowing through diode-connected FET 347, thereby raising the gate voltages of FETs 343 and 344. The increased gate voltages of FETs 343 and 344 cause FETs 343 and 344 to conduct more current. This increased current through FETs 343 and 344, as well as the increased current flowing through FET 347 via resistors 341 and 342, increase the amount of current flowing though resistors 351 and 352. The increased current flowing though resistors 351 and 352 increases the voltage at the source nodes of FETs 343 and 344. This, along with the increased current flowing through FET 347 via resistors 341 and 342 causes the voltage at node 315 to increase—thus closing the feedback loop.

If node 315 is higher than the target voltage, comparator 361 will indicate this to calibration control 360. In response, calibration control 360 will decrease the current flowing through controlled current source 345. The decreased current through controlled current source 345 decreases the current flowing through diode-connected FET 347, thereby lowering the gate voltages of FETs 343 and 344. The lowered gate voltages of FETs 343 and 344 cause FETs 343 and 344 to conduct less current. This decreased current through FETs 343 and 344, as well as the decreased current flowing through FET 347 via resistors 341 and 342, decrease the amount of current flowing though resistors 351 and 352. The decreased current flowing though resistors 351 and 352 decreases the voltage at the source nodes of FETs 343 and 344. The decreased current flowing though resistors 351 and 352, along with the decreased current flowing through FET 347 via resistors 341 and 342, causes the voltage at node 315 to decrease. As can be understood from the foregoing, the feedback loop formed by comparator 361, calibration control 360, and elements of receiver 340 cause the voltage at node 315 to stabilize at a value that matches or approximates the target voltage output by $V_{CM}$ capture 370.

$V_{CM}$ capture 370 can determine an output target voltage in a number of ways. In an embodiment, $V_{CM}$ capture 370 can receive a voltage from an off-chip source. This is illustrated in FIG. 3 by the optional receiver block 371. The received voltage can be equal to, or a multiple of, the desired common-mode voltage. The multiple of the desired common-mode voltage can be, for example, the supply voltage used to drive the transmitter sending the differential signal to receiver 340 (e.g., $V_{DDIO}$). In the case of receiving a multiple of the desired common-mode voltage, $V_{CM}$ capture 370 can divide down the received voltage to generate the target voltage to output. For example, $V_{CM}$ capture can receive $V_{DDIO}$ when a common mode voltage of $V_{DDIO}/2$ is desired. In this case, $V_{CM}$ capture can use a resistor divider network to output $V_{DDIO}/2$ to comparator 361.

In an embodiment, $V_{CM}$ capture 370 can receive data corresponding to a desired common-mode voltage from an off-chip source. This is illustrated in FIG. 3 by the optional sideband block 372. The off-chip source can communicate the data via, for example, a sideband interface or other control interface. The received data can be converted by $V_{CM}$ capture 370 to a target voltage. For example, $V_{CM}$ capture 370 can receive a digital value that it applies to a digital-to-analog converter. The digital-to-analog converter can then output the target voltage.

In an embodiment, $V_{CM}$ capture 370 can generate an on-chip reference voltage. This is illustrated in FIG. 3 by the optional reference block 373. The reference voltage can be equal to, or a multiple of, the desired common-mode voltage. In the case of generating a multiple of the desired common-mode voltage, $V_{CM}$ capture 370 can divide down the reference voltage to generate the target voltage to output.

In an embodiment, $V_{CM}$ capture 370 can generate an on-chip reference voltage based on a transmitter. This is illustrated in FIG. 3 by the optional transmitter block 374. The transmitter block 374 can be on the same integrated circuit, or a different integrated circuit. In an embodiment, transmitter block 374 can be a replica of a transmitter and on-die termination that outputs the desired common-mode voltage. In an embodiment, transmitter block 374 can include a sample-and-hold circuit to capture the common-mode voltage output by a transmitter during idle periods. In an embodiment, transmitter block 374 can include a sample-and-hold circuit to capture an average, or low-pass filtered, common-mode voltage output by a transmitter during active and/or idle periods. The common-mode voltage can be captured or received from a transmitter that is not coupled to receiver 340 (e.g., a dummy or known inactive transmitter).

Figure 4:
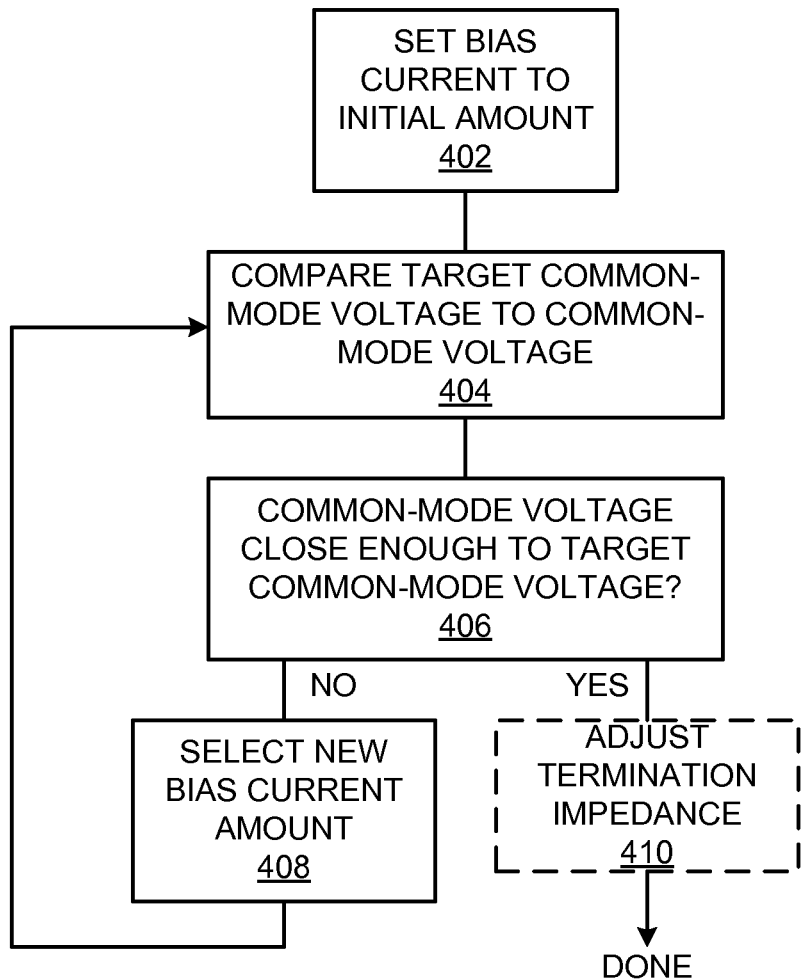
FIG. 4 is a flowchart illustrating closed-loop common-mode calibration.

FIG. 4 is a flowchart illustrating closed-loop common-mode calibration. The steps illustrated in FIG. 4 can be performed, e.g., by one or more elements of closed-loop system 300. A bias current is set to an initial amount (402). For example, calibration control 360, upon power up or the initiation of a calibration sequence, may set controlled current source 345 to conduct an initial current flow. This initial current flow may be zero, a maximum, or a predetermined intermediate setting.

A target common-mode voltage is compared to a common-mode voltage (404). For example, comparator 361 can compare a target common-mode voltage output by $V_{CM}$ capture 370 to the common-mode voltage of receiver 340 (i.e., the voltage at node 315) at a block 406. For example, at block 406 calibration control 360 can determine whether the common-mode voltage of receiver 340 is within a desired range, or accuracy, of the target voltage output by $V_{CM}$ capture 370. If the common-mode voltage is not close enough to the target mode voltage, flow proceeds from block 406 to block 408. If the common-mode voltage is close enough to the target mode voltage, flow proceeds from block 406 to optional block 410.

If the common-mode voltage is not close enough to the target mode voltage, a new bias current amount is selected (408). For example, if the common-mode voltage of receiver 340 is more than a threshold amount lower (or higher) than the target voltage output by $V_{CM}$ capture 370, calibration control 360 can select a new bias current amount. Calibration control 360 can increase (or decrease) the amount of current flowing through controlled current source 345 by one step (or increment). In another example, calibration control 360 can implement a binary or other search algorithm as it adjusts to the amount of current flowing through controlled current source 345 to converge the voltage at node 315 to the target voltage output by $V_{CM}$ capture 370. After selecting a new bias current amount, flow proceeds back to block 404.

If the common-mode voltage is close enough to the target common-mode voltage, a termination impedance can optionally be adjusted (410). For example, resistors 341 and 342 can be adjusted. After the termination impedance(s) are optionally adjusted, the flow illustrated in FIG. 4 is done.

Figure 5:
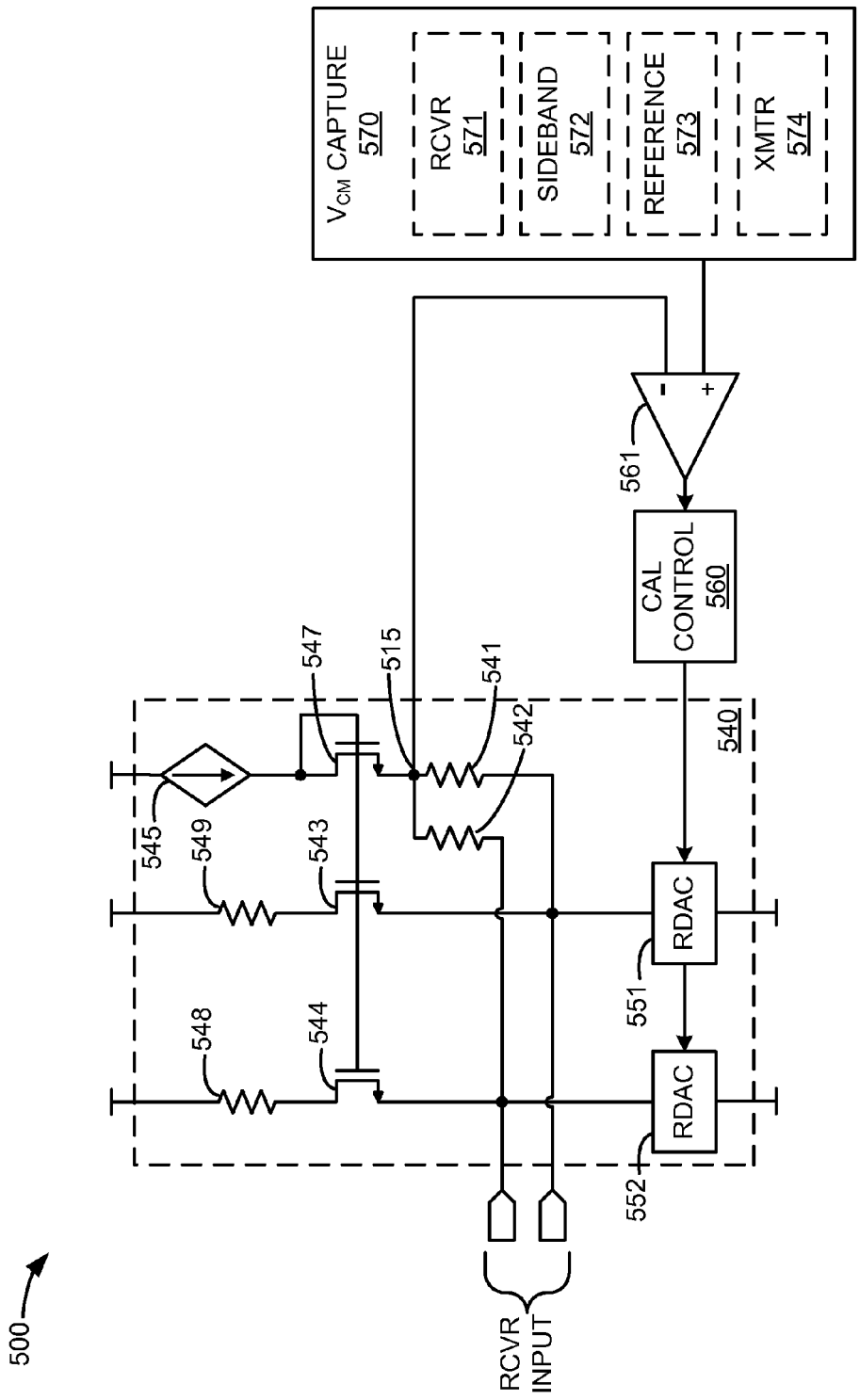
FIG. 5 is an illustration of a closed-loop system for common-mode calibration.

FIG. 5 is an illustration of another closed-loop system including common-mode calibration. In FIG. 5, closed-loop system 500 comprises a receiver 540, a calibration control 560, a comparator 561, and $V_{CM}$ capture 570. Receiver 540 comprises n-channel FETs 543, 544, and 547, a bias current source 545, resistors 541, 542, 548, and 549, and resistive digital-to-analog converters (RDACs) 551 and 552. The input to receiver 540 is a differential voltage signal applied between the source of FET 544 and the source of FET 543. The output of receiver 540 can be a differential voltage generated between the drains of FET 544 and FET 543. $V_{CM}$ capture 570 optionally includes a voltage receiver 571, a sideband interface 572, a voltage reference 573, or a transmitter 574. VCM capture 570, and its optional included elements voltage receiver 571, sideband interface 572, voltage reference 573, and transmitter 574, can be, and function, as described in relation to $V_{CM}$ capture 370 of FIG. 3 and its optional included elements.

A first terminal of resistor 548 is connected to a positive power supply terminal. A second terminal of resistor 548 is connected to the drain of FET 544. A first terminal of RDAC 552 is connected to the source of FET 544. A second terminal of RDAC 552 is connected to a negative power supply terminal. A first terminal of resistor 549 is connected to the positive power supply terminal. A second terminal of resistor 549 is connected to the drain of FET 543. A first terminal of RDAC 551 is connected to the source of FET 543. A second terminal of RDAC 551 is connected to the negative power supply terminal. RDAC 551 and RDAC 552 are operatively coupled to calibration control 560 to receive a digital value from calibration control 560 that controls the respective impedances between the first and second terminals of RDAC 551 and RDAC 552. The impedances generated by RDAC 551 and RDAC 552 are typically the same, or closely approximate each other.

A first terminal of resistor 541 is connected to the source of FET 543. A second terminal of resistor 541 is connected to the source of FET 547. A first terminal of resistor 542 is connected to the source of FET 544. A second terminal of resistor 542 is connected to the source of FET 547 (a.k.a. node 515). Thus, when resistor 541 and resistor 542 have the same value, the voltage on node 515 reflects the common-mode voltage of receiver 540. Typically, resistors 541 and 542 will have the same value. Resistors 541 and 542 may be controlled resistors that are calibrated to serve as on-die termination resistors.

The gate and drain of FET 547 are connected together, thereby forming a diode-connected FET. Bias current source 545 is connected between the positive power supply terminal and the gate and drain of FET 547. The gate and drain of FET 547 are also connected to the gates of FET 544 and FET 543. Thus, the current flowing through bias current source 545 determines the current flowing through FETs 543 and 544 in a current-mirror-like arrangement. It should be understood that receiver 540 comprises a common-gate type differential amplifier that amplifies the voltage differential at the receiver 540 input and outputs it at receiver 540's output between the drains of FET 543 and 544. Receiver 540 may be configured to receive a common-mode voltage and voltage swings compatible with one or more of the signaling technologies mentioned in the discussion of FIG. 1.

Because of the current-mirror-like arrangement of FET 547 in relation to FETs 543 and 544, the current flowing through bias current source 545 determines the current flowing through RDAC 551 and the current flowing through RDAC 552. Because bias current 545 is nominally constant, the respective impedances (as controlled by calibration control 560) between the first and second terminals of RDAC 551 and RDAC 552 determine the common-mode voltage seen at the differential input of receiver 540.

In an embodiment, $V_{CM}$ capture 570 outputs a target voltage. The target voltage is used as the control input of a feedback loop. The feedback voltage of the feedback loop is derived from node 515. It should be understood that node 515 corresponds to the common-mode voltage of receiver 515. Comparator 561 outputs a signal to calibration control 560 indicating whether node 515 is at a higher or lower voltage than the target voltage output by $V_{CM}$ capture 570. Calibration control 560 controls the impedances of RDAC 551 and RDAC 552 by providing RDAC 551 and RDAC 552 with a digital value. The digital value provided to RDAC 551 and RDAC 552 may be coded. For example, the digital value provided to RDAC 551 and RDAC 552 may be a thermometer code value, a gray code value, or a simple linear binary encoding. Calibration control 560 uses the signal received from comparator 561 to determine whether to decrease or increase, respectively, the impedances of RDAC 551 and RDAC 552. These adjustments to RDAC 551 and RDAC 552 cause the voltage on node 515 to stabilize at or near the target voltage output by $V_{CM}$ capture 570.

For example, if node 515 is lower than the target voltage, comparator 561 will indicate this to calibration control 560. In response, calibration control 560 will output a digital value that increases the impedances of RDAC 551 and RDAC 552. The increased impedances of RDAC 551 and RDAC 552 increases the voltage at the source nodes of FETs 543 and 544. This causes the voltage at node 515 to increase—thus closing the feedback loop.

If node 515 is higher than the target voltage, comparator 561 will indicate this to calibration control 560. In response, calibration control 560 will output a digital value that decreases the impedances of RDAC 551 and RDAC 552. The decreased impedances of RDAC 551 and RDAC 552 decrease the voltage at the source nodes of FETs 543 and 544. This causes the voltage at node 515 to decrease. As can be understood from the foregoing, the feedback loop formed by comparator 561, calibration control 560, and elements of receiver 540 cause the voltage at node 515 to stabilize at a value that matches or approximates the target voltage output by $V_{CM}$ capture 570. $V_{CM}$ capture 570 may determine a target voltage to output a number of ways. These ways were discussed in relation to $V_{CM}$ capture 370 in FIG. 3. Thus, for the sake of brevity, this discussion will not be repeated here.

Figure 6:
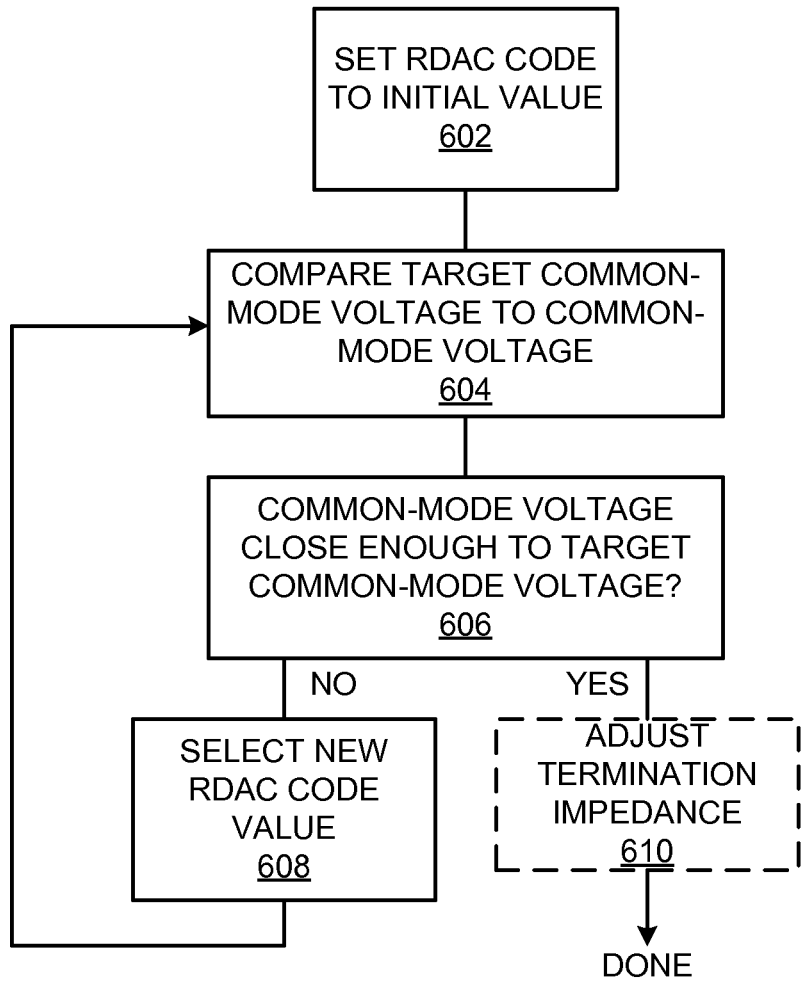
FIG. 6 is a flowchart illustrating closed-loop common-mode calibration.

FIG. 6 is a flowchart illustrating closed-loop common-mode calibration. The steps illustrated in FIG. 6 may be performed, e.g., by one or more elements of closed-loop system 500. An RDAC code is set to an initial value (602). For example, calibration control 560, upon power up, or the initiation of a calibration sequence, may send RDAC 551 and RDAC 552 an initial value that sets their impedances. This initial value may be zero, a maximum, or an intermediate setting.

A target common-mode voltage is compared to a common-mode voltage (604). For example, comparator 561 may compare a target common-mode voltage output by $V_{CM}$ capture 570 to the common-mode voltage of receiver 540 (i.e., the voltage at node 515). Calibration control 560 can determine whether the common-mode voltage of receiver 540 is within a desired range, or accuracy, of the target voltage output by $V_{CM}$ capture 570, at a block 606. If the common-mode voltage is not close enough to the target mode voltage, flow proceeds to block 608. If the common-mode voltage is close enough to the target mode voltage, flow proceeds to optional block 610.

If the common-mode voltage is not close enough to the target mode voltage, a new RDAC code value is selected (608). For example, if the common-mode voltage of receiver 540 is more than a threshold amount lower (or higher) than the target voltage output by $V_{CM}$ capture 570, calibration control 560 selects a new RDAC code value to send to RDAC 551 and RDAC 552. Calibration control 560 may increase (or decrease) the impedances of RDAC 551 and RDAC 552 by one step (or increment). In another example, calibration control 560 may implement a binary or other search algorithm as it adjusts impedances of RDAC 551 and RDAC 552 to converge the voltage at node 515 to the target voltage output by $V_{CM}$ capture 570. After selecting a new RDAC code value, flow proceeds back to block 604.

If the common-mode voltage is close enough to the target common-mode voltage, a termination impedance may optionally be adjusted (610). For example, resistors 541 and 542 may be adjusted. After the termination impedance(s) are optionally be adjusted, the flow illustrated in FIG. 6 is done.

Figure 7:
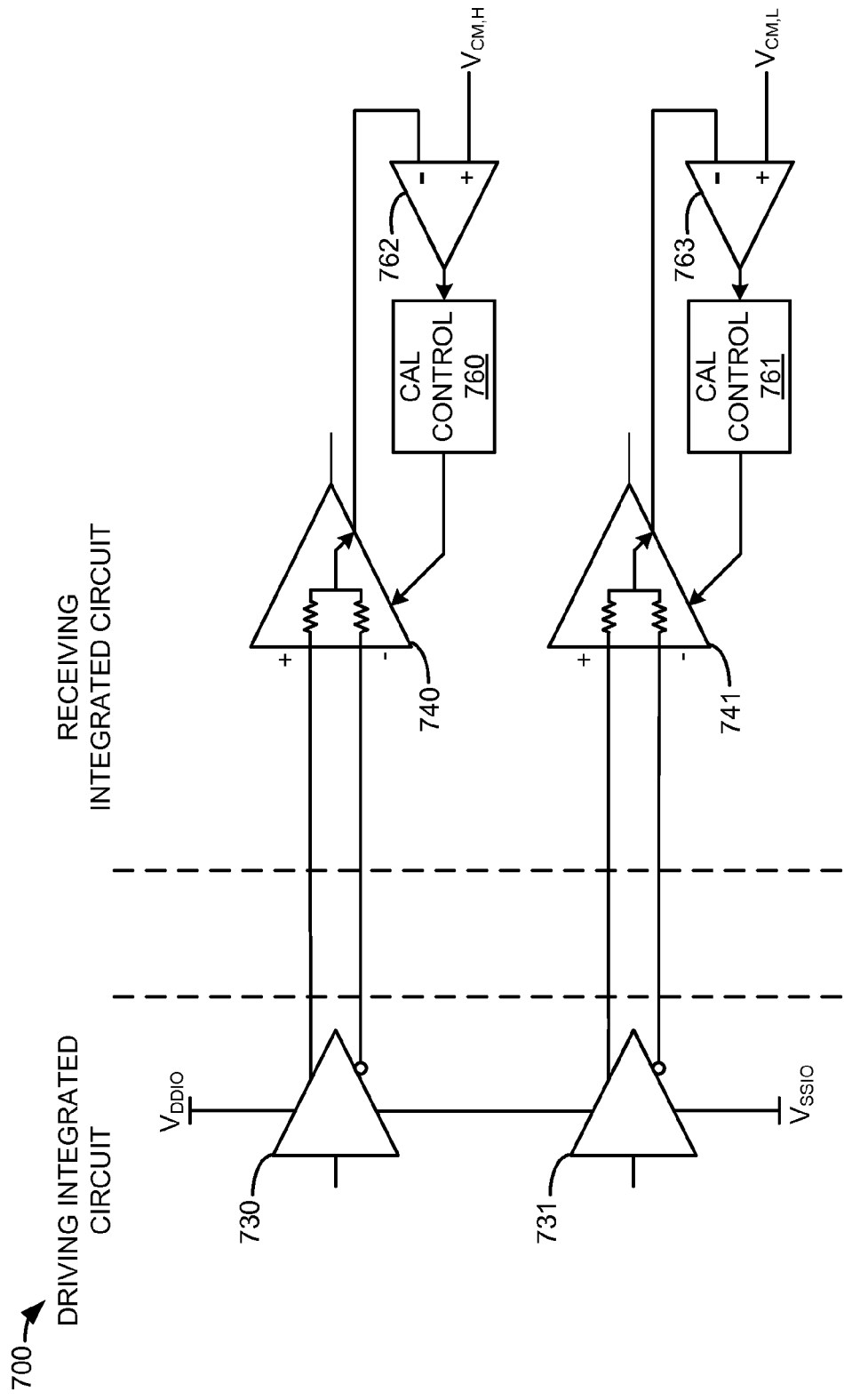
FIG. 7 is an illustration of a system for calibrating the common-mode voltages of receivers coupled to stacked transmitters.

FIG. 7 is an illustration of a system 700 including calibration for the common-mode voltages of receivers coupled to stacked transmitters. In FIG. 7, communication system 700 comprises transmitter circuit 730, transmitter circuit 731, receiver circuit 740, receiver circuit 741, calibration control 760, calibration control 761, comparator 762, and comparator 763. Receiver circuits 740-741 may comprise, or function like, receivers 140, 240, 340, or 540. As illustrated in FIG. 7, transmitter circuits 730-731 are typically included on an integrated circuit that is driving differential signals. Receiver circuits 740-741, calibration controls 760-761, and comparators 762-763 would typically reside on an integrated circuit that is receiving differential signals.

In FIG. 7, the positive supply terminal of transmitter circuit 730 is connected to positive power supply $V_{DDIO}$. The negative power supply terminal of transmitter circuit 730 is connected to an intermediate node. The non-inverting output of transmitter circuit 730 is connected to the non-inverting input of receiver circuit 740. The inverting output of transmitter circuit 730 is connected to the inverting input of receiver circuit 740.

The positive supply terminal of transmitter circuit 731 is connected to the intermediate node. Thus, transmitter circuit 731 receives its positive power supply current from the negative supply terminal of transmitter circuit 730. The negative power supply terminal of transmitter circuit 731 is connected to negative power supply $V_{SSIO}$. The non-inverting output of transmitter circuit 731 is connected to the non-inverting input of receiver circuit 741. The inverting output of transmitter circuit 731 is connected to the inverting input of receiver 741.

A two-transmitter stack is illustrated in FIG. 7. It should be understood, however, that more than two transmitters may be stacked. A multi-transmitter stack may have more than two transmitters in series with all but the transmitter connected to the positive supply receiving their positive supply voltage from another transmitter in the stack. To receive the signals from a multi-transmitter stack, more than two receivers each having an appropriate common-mode voltage at their inputs may be provided.

Receiver circuit 740 provides its common-mode voltage (or an indicator thereof) to the inverting input of comparator 762. Comparator 762 receives a first target common-mode voltage, $V_{CM,H}$. $V_{CM,H}$ is a voltage associated with the common-mode voltage output by an upper transmitter circuit (e.g. transmitter circuit 730) of a stacked pair of transmitter circuits. $V_{CM,H}$ may be generated in any of the ways that were discussed in relation to $V_{CM}$ capture 370 in FIG. 3. Thus, for the sake of brevity, this discussion will not be repeated here.

$V_{CM,H}$ is used as the control input of a feedback loop to set the common-mode voltage of receiver circuit 740. Comparator 762 outputs a signal to calibration control 760 indicating whether the common-mode voltage of receiver circuit 740 is at a higher or lower voltage than the first target voltage $V_{CM,H}$. Calibration control 760 controls the common-mode voltage of receiver circuit 740. Calibration control 760 may control the common-mode voltage of receiver circuit 740 by setting a bias current (as discussed, for example, in relation to FIG. 3 and FIG. 4) or by setting a digital-to-analog converter code (as discussed, for example, in relation to FIG. 5 and FIG. 6). Calibration control 760 uses the signal received from comparator 762 to determine whether to decrease or increase the common-mode voltage of receiver circuit 740. These adjustments cause the common-mode voltage receiver circuit 740 to stabilize at or near the first target voltage $V_{CM,H}$.

Receiver circuit 741 provides its common-mode voltage (or an indicator thereof) to the inverting input of comparator 763. Comparator 763 receives a second target common-mode voltage, $V_{CM,L}$. $V_{CM,L}$ is a voltage associated with the common-mode voltage output by a lower transmitter circuit (e.g. transmitter circuit 731) of a stacked pair of transmitter circuits. $V_{CM,L}$ may be generated in any of the ways that were discussed in relation to $V_{CM}$ capture 370 in FIG. 3. Thus, for the sake of brevity, this discussion will not be repeated here.

$V_{CM,L}$ is used as the control input of a feedback loop to set the common-mode voltage of receiver circuit 741. Comparator 763 outputs a signal to calibration control 761 indicating whether the common-mode voltage of receiver circuit 741 is at a higher or lower voltage than the second target voltage $V_{CM,L}$. Calibration control 761 controls the common-mode voltage of receiver circuit 741. Calibration control 761 may control the common-mode voltage of receiver circuit 741 by setting a bias current (as discussed, for example, in relation to FIG. 3 and FIG. 4) or by setting a digital-to-analog converter code (as discussed, for example, in relation to FIG. 5 and FIG. 6). Calibration control 761 uses the signal received from comparator 763 to determine whether to decrease or increase the common-mode voltage of receiver circuit 741. These adjustments cause the common-mode voltage receiver circuit 741 to stabilize at or near the second target voltage $V_{CM,L}$.

Figure 8:
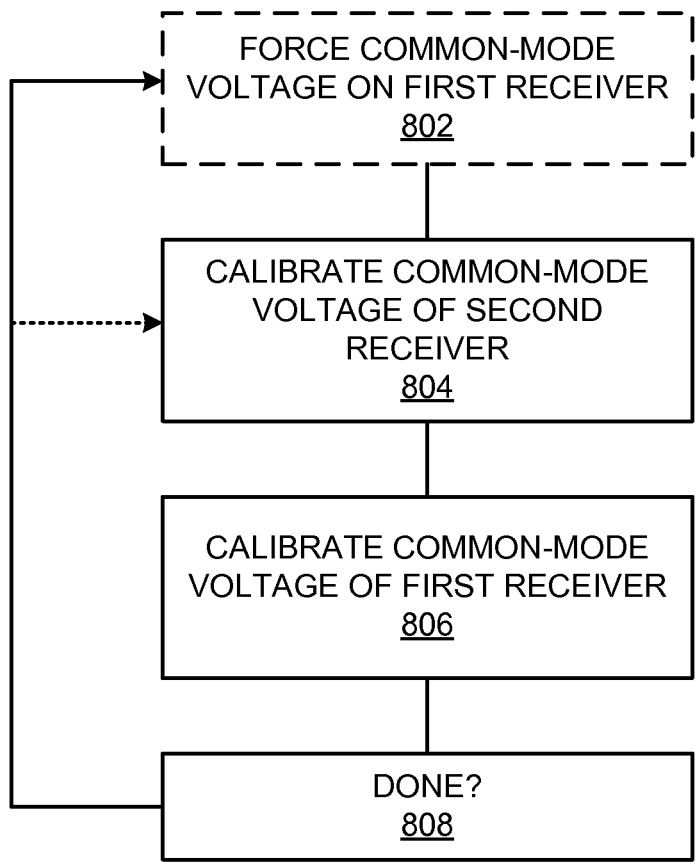
FIG. 8 is a flowchart illustrating calibration of the common-mode voltages of receivers coupled to stacked transmitters.

FIG. 8 is a flowchart illustrating calibration of the common-mode voltages of receivers coupled to stacked transmitters. The steps illustrated in FIG. 8 may be performed by one or more elements of communication system 700. Optionally, a common-mode voltage is forced on a first receiver (802). For example, calibration control 761 may temporarily hold the common-mode voltage of receiver circuit 741 at a steady-state value. Calibration control 761 may hold the common-mode voltage of receiver circuit 741 at a predetermined steady-state value.

A common-mode voltage of a second receiver is calibrated (804). For example, calibration control 760 may calibrate the common-mode voltage of receiver circuit 740 to match or approximate $V_{CM,H}$. Next, the common-mode voltage of the first receiver is calibrated (806). For example, calibration control 761 may be released from holding the common-mode voltage of receiver circuit 741 at a steady state value. Calibration control 761 may then calibrate the common-mode voltage of receiver circuit 741 to match or approximate $V_{CM, L}$.

After the common-mode voltage of the second receiver is calibrated, it is determined whether to repeat the process (808). If the process is to be repeated, flow may proceed to block 802 or optionally block 804. The process may be repeated in order to better converge the common-mode voltages of the first and second receivers. The process may need to be repeated because the common-mode voltage of the first and/or second receiver may affect the common-mode voltage output by the transmitter coupled to those receivers or vice versa.

Figure 9:
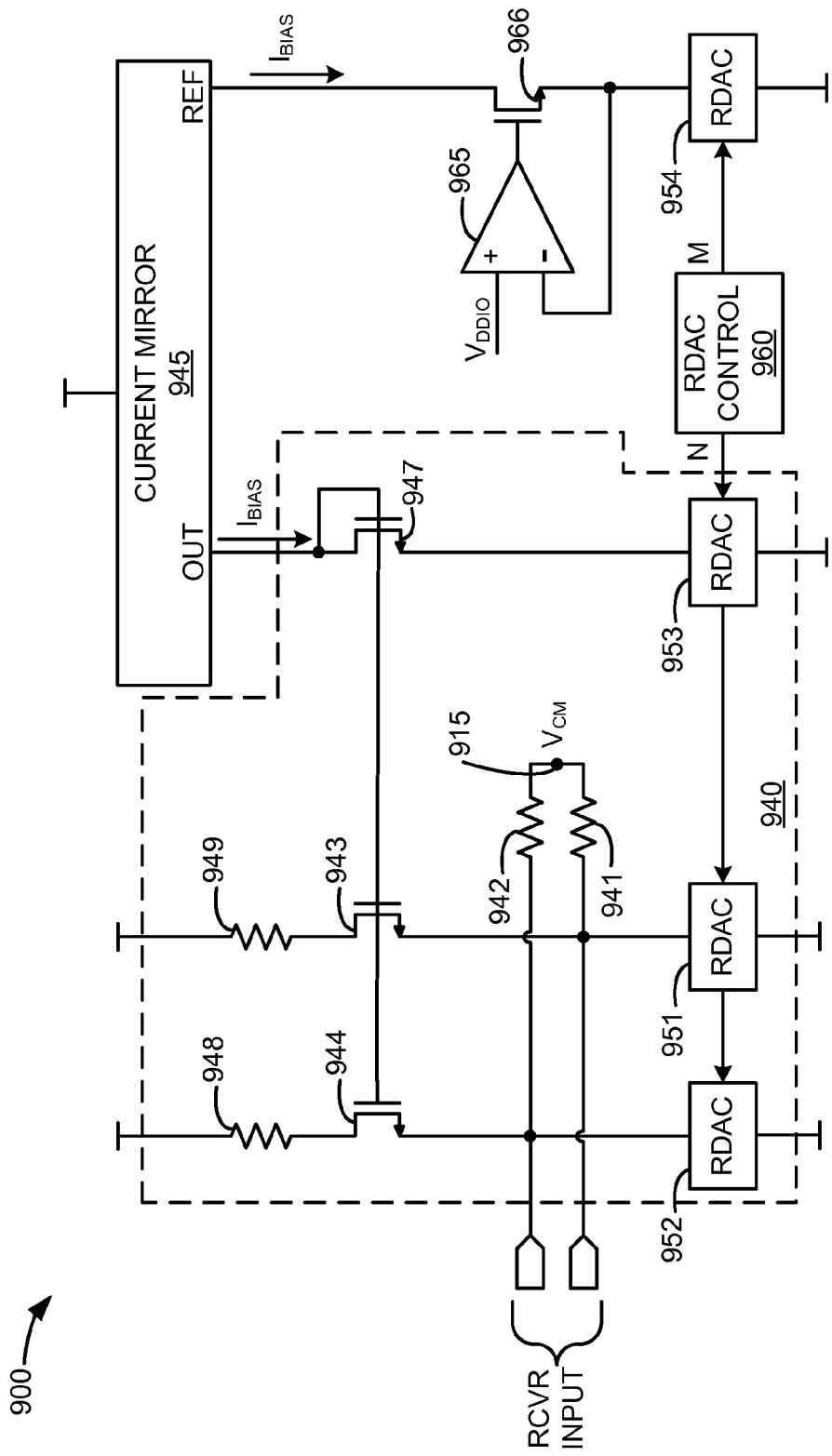
FIG. 9 is an illustration of a common-gate amplifier biasing system.

FIG. 9 is an illustration of a common-gate amplifier system 900 including a biasing system. In FIG. 9, system 900 comprises a receiver 940, a current mirror 945, an RDAC 954, an RDAC control 960, an operation amplifier (op-amp) 965, and a FET 966. Receiver 940 comprises FETs 943, 944, and 947, resistors 941, 942, 948, and 949, and RDACs 951, 952, and 953. The input to receiver 940 is a differential voltage signal received between the source of FET 944 and the source of FET 943, which act together in a common-gate amplifier. The output of receiver 940 may be a differential voltage taken between the drains of FET 944 and FET 943. Digital values of M and N which determine the common-mode voltage of receiver 940 may be set, and stored by, registers in RDAC control 960.

In an embodiment, RDAC 951, RDAC 952, RDAC 953, and RDAC 954 are designed to match each other. In other words, when any two of RDACs 951-954 are given the same RDAC code by RDAC control 960, they will have the same resistance between their respective first and second terminals. Likewise, in another embodiment, RDACs 951-954 are linearly related with respect to different given RDAC codes. That is, the ratio of the resistance of one of RDACs 951-954 when it is given an RDAC code of N to the resistance of one of RDACs 951-954 when it is given an RDAC code of M equals N divided by M (N/M). RDAC control 960 can, in a similar embodiment, understand which codes produce such a linear relationship in resistance (e.g., through a sorted code table), without the codes themselves being related linearly.

A first terminal of resistor 948 is connected to a positive power supply terminal. A second terminal of resistor 948 is connected to the drain of FET 944. A first terminal of RDAC 952 is connected to the source of FET 944. A second terminal of RDAC 952 is connected to a negative power supply terminal. A first terminal of resistor 949 is connected to the positive power supply terminal. A second terminal of resistor 949 is connected to the drain of FET 943. A first terminal of RDAC 951 is connected to the source of FET 943. A second terminal of RDAC 951 is connected to the negative power supply terminal. RDAC 951 and RDAC 952 receive a digital value (N) from RDAC control 960 that controls the respective impedances between the first and second terminals of RDAC 951 and RDAC 952.

A first terminal of resistor 941 is connected to the source of FET 943. A second terminal of resistor 941 is connected to a node 915. A first terminal of resistor 942 is connected to the source of FET 944. A second terminal of resistor 542 is connected to node 915. Thus, when resistor 941 and resistor 942 have the same value, the voltage on node 915 reflects the common-mode voltage of receiver 940. Typically, resistors 941 and 942 will have the same value. Resistors 941 and 942 may be controlled resistors that are calibrated to serve as on-die termination resistors.

The gate and drain of FET 947 are connected together thereby forming a diode-connected FET. Current mirror 945 is connected to the positive power supply terminal. Current mirror 945 sends a bias current ($I_{BIAS}$) through diode-connected FET 947. The source of FET 947 is connected to a first terminal of RDAC 953. A second terminal of RDAC 953 is connected to the negative power supply terminal. RDAC 953 receives the same digital value (N) from RDAC control 960 as RDAC 951 and RDAC 952 receive. Thus, RDAC 951, 952, and 953 typically have the same impedance.

The gate and drain of FET 947 are also connected to the gates of FET 944 and FET 943. Thus, the current flowing from the output of current mirror 945 ($I_{BIAS}$) determines the current flowing through FETs 943 and 944 in a current-mirror-like arrangement. Because RDAC 951 and RDAC 952 both receive the same digital value as RDAC 953 (and thus have the same impedance), the voltage at the source node of FET 947 matches, or approximates, the common-mode voltage of receiver 940. By controlling the value of $I_{BIAS}$ so that it matches (or closely approximates) the common-mode of an associated transmitter, it is therefore possible to minimize any common-mode offset error. An exemplary circuit which sets $I_{BIAS}$ in this manner is described below.

It should be understood that receiver 940 comprises a common-gate type differential amplifier that amplifies the voltage differential at the receiver 940 input and outputs it at receiver 940's output between the drains of FET 943 and 944. Receiver 940 may be configured to receive a common-mode voltage and voltage swings compatible with one or more of the signaling technologies mentioned in the discussion of FIG. 1.

Because of the current-mirror-like arrangement of FET 947 in relation to FETs 943 and 944, the current flowing from the output of current mirror 945 determines the current flowing through RDAC 951 and RDAC 952, respectively. Because the output of current mirror 945 is nominally constant, the impedances (as controlled by RDAC control 960) between the first and second terminals of RDAC 951 and RDAC 952 determine the common-mode voltage seen at the differential input of receiver 940.

An exemplary analog continuous-time circuit which sets the $I_{BIAS}$ value such that the input common-mode of the common-gate receiver matches (or closely approximates) the common-mode of an associated transmitter is described here. Note that to one skilled in the art, other $I_{BIAS}$ generation circuits (both analog continuous-time circuits and digital discrete-time circuits) could be used here in the alternative. Referring to FIG. 9, the reference terminal of current mirror 945 is connected to the drain of FET 966. The source of FET 966 is connected to a first terminal of RDAC 954. A second terminal of RDAC 954 is connected to the negative supply voltage. RDAC 954 receives a digital value (M) from RDAC control 960 that controls the impedance between the first and second terminals of RDAC 954. The source of FET 966 is also connected to the inverting input of op-amp 965. The non-inverting input of op-amp 965 is connected to a reference voltage $V_{DDIO}$. The output of op-amp 965 is connected to the gate of FET 966.

RDAC 954, op-amp 965, and FET 966 function as a continuous time feedback circuit to set the reference current pulled from the reference terminal (REF) of current mirror 945. The current flowing from the REF terminal of current mirror 945 is mirrored out of the output terminal (OUT) or current mirror 945. Because the non-inverting input of op-amp 965 is connected to $V_{DDIO}$, and the inverting input is connected to the source of FET 966, op-amp 965 will adjust the gate of FET 966 such that FET 966 conducts the amount of current necessary to make the voltage at the source of FET 966 match $V_{DDIO}$. In other words, the reference current $I_{BIAS}$ will be $V_{DDIO}$ divided by the resistance of RDAC 954 (i.e., $I_{BIAS}=V_{DDIO}/R_{954}$). Accordingly, as $V_{DDIO}$ varies in continuous time, $I_{BIAS}$ will vary proportionally in continuous time. Likewise, the mirrored current from current mirror 945 flowing through FET 947 and RDAC 953 (and therefore FETs 943 and 944) will vary in continuous time in response to variations in $V_{DDIO}$.

Because the same current, $I_{BIAS}$, is made to flow through RDAC 953, the voltage at the source of FET 947, will be equal to $I_{BIAS}$ times the resistance of RDAC 953. Likewise, because the current through FET 947 is mirrored by the operation of FETs 944 and 943, the common-mode voltage of receiver 940 (i.e., voltage at node 915) will be equal to $I_{BIAS}$ times the resistance of RDAC 952, or RDAC 951. This leads to the following equation:

$$I_{BIAS}=V_{DDIO}/R_{954}=V_{CM}/R_{951}=V_{CM}/R_{952}=V_{CM}/R_{953}$$

Solving for $V_{CM}$ leads to:

$$I_{BIAS} = \frac{V_{DDIO}}{R_{954}} = \frac{V_{CM}}{R_{951}} = \frac{V_{CM}}{R_{952}} = \frac{V_{CM}}{R_{953}}$$

Solving for $V_{CM}$ leads to:

$$V_{CM} = \frac{R_{951}}{R_{954}}V_{DDIO} = \frac{R_{952}}{R_{954}}V_{DDIO} = \frac{R_{953}}{R_{954}}V_{DDIO}$$

Thus, the common-mode voltage of receiver 940 can be controlled by the ratio of the resistance of RDACs 951-953 to the resistance of RDAC 954. For example, if N and M are selected to be 3 and 4, respectively, and RDAC 951-954 are linear, the common-mode voltage of receiver 940 will be $\frac{3}{4}V_{DDIO}$. In another example, if N and M are selected to be 1 and 4, respectively, the common-mode voltage of receiver 940 will be $\frac{1}{4}V_{DDIO}$. Accordingly, as $V_{DDIO}$ varies in continuous time, $V_{CM}$ will vary proportionally in continuous time according to the set ratio.

Figure 10:
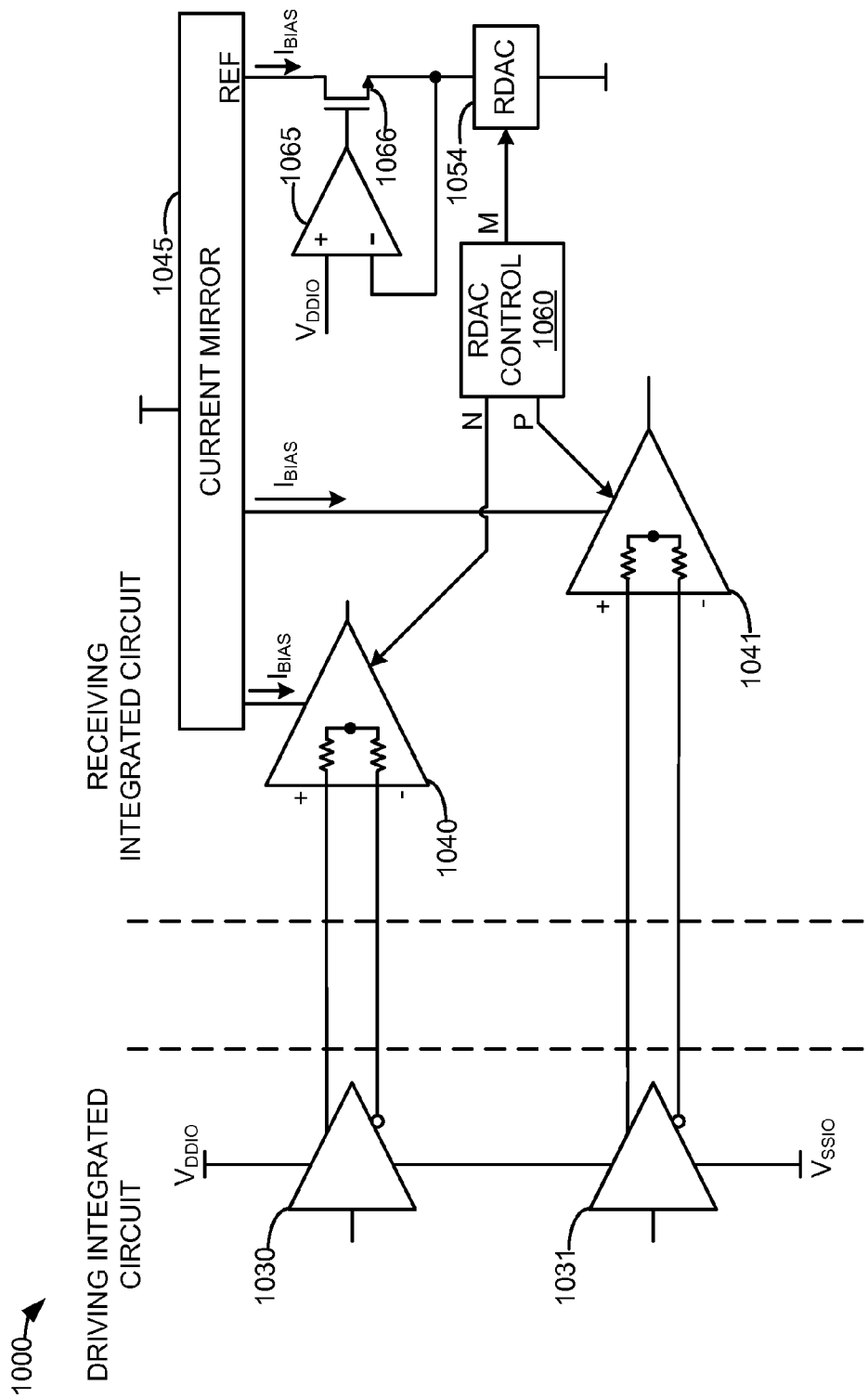
FIG. 10 is an illustration of a system for biasing common-gate amplifiers coupled to stacked transmitters.

FIG. 10 is an illustration of a system 1000 including biasing for common-gate amplifiers coupled to stacked transmitters. In FIG. 10, communication system 1000 comprises a transmitter circuit 1030, a transmitter circuit 1031, a receiver circuit 1040, a receiver circuit 1041, a current mirror 1045, an RDAC 1054, an RDAC control 1060, an op-amp 1065, and a FET 1066. Receiver circuits 1040-1041 may comprise, or function like, receiver 940. As illustrated in FIG. 10, transmitter circuits 1030-1031 are typically included on an integrated circuit that is driving differential signals. Receiver circuit 1040, receiver circuit 1041, current mirror 1045, RDAC 1054, RDAC control 1060, op-amp 1065, and FET 1066 are typically part of an integrated circuit that is receiving differential signals. Digital values of M, N, and P, which determine the common-mode voltages of receivers 1040-1041, may be set, and stored by, registers in RDAC control 1060.

In FIG. 10, a positive supply terminal of transmitter circuit 1030 is connected to positive power supply $V_{DDIO}$. The negative power supply terminal of transmitter circuit 1030 is connected to an intermediate node. The non-inverting output of transmitter circuit 1030 is connected to the non-inverting input of receiver circuit 1040. The inverting output of transmitter circuit 1030 is connected to the inverting input of receiver circuit 1040.

The positive supply terminal of transmitter circuit 1031 is connected to the intermediate node. Thus, transmitter circuit 1031 receives its positive power supply current from the negative supply terminal of transmitter circuit 1030. The negative power supply terminal of transmitter circuit 1031 is connected to a negative power supply $V_{SSIO}$. The non-inverting output of transmitter circuit 1031 is connected to the non-inverting input of receiver circuit 1041. The inverting output of transmitter circuit 1031 is connected to the inverting input of receiver 1041.

RDAC 1054, op-amp 1065, and FET 1066 function as a continuous time feedback circuit to set the reference current pulled from the reference terminal (REF) of current mirror 1045. The current flowing from the REF terminal of current mirror 1045 is mirrored out of the output terminals of current mirror 1045. Because the non-inverting input of op-amp 1065 is connected to $V_{DDIO}$, and the inverting input is connected to the source of FET 1066, op-amp 1065 will adjust the gate of FET 1066 such that FET 1066 conducts the amount of current necessary to make the voltage at the source of FET 1066 match $V_{DDIO}$. In other words, the reference current $I_{BIAS}$ will be $V_{DDIO}$ divided by the resistance of RDAC 1054 (i.e., $I_{BIAS}=V_{DDIO}/R_{1054}$). Accordingly, as $V_{DDIO}$ varies in continuous time, $I_{BIAS}$ will vary proportionally in continuous time.

As discussed previously with respect to FIG. 9, the common-mode voltage of receivers 1040-1041 can be controlled by the respective ratios of the resistance of RDACs internal to receivers 1040-141 to the resistance of RDAC 1054. RDAC control 1060 outputs a digital value M to RDAC 1054, a digital value N to the RDACs of receiver 1040, and a digital value P to the RDACs of receiver 1041. Thus, the common-mode voltage of receiver 1040 can be set to $(N/M)*V_{DDIO}$ and the common-mode voltage of receiver 1041 can be set to $(P/M)*V_{DDIO}$. For example, if P is set to 1 while N is set to 3 and M is set to 4, the common-mode of receiver 1040 will be set to $\frac{3}{4}V_{DDIO}$, and the common-mode of receiver 1041 will be $\frac{1}{4}V_{DDIO}$. This is a preferred solution for a system with two stacked transmitters. The digital values of M, N, and P may be set and stored by RDAC control 1060 in a register.

A two-transmitter stack is illustrated in FIG. 10. It should be understood, however, that more than two transmitters may be stacked. A multi-transmitter stack may have more than two transmitters in series with all but the transmitter connected to the positive supply receiving their positive supply voltage from another transmitter in the stack. To receive the signals from a multi-transmitter stack, more than two receivers each having an appropriate common-mode voltage set to a respective fraction of $V_{DDIO}$ by additional outputs from RDAC control 1060 may be provided.

The devices, circuits, and systems described above may be implemented in computer systems, or include components that are stored by computer systems. The systems described above may also contain one or more components that can be stored on a computer readable medium. Devices, circuits, and systems described herein may be implemented using computer-aided design tools available in the art, and embodied by computer-readable files containing software descriptions of such circuits. This includes, but is not limited to one or more elements of systems 100, 200, 300, 500, 700, 900, and 1000, and their components. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 11:
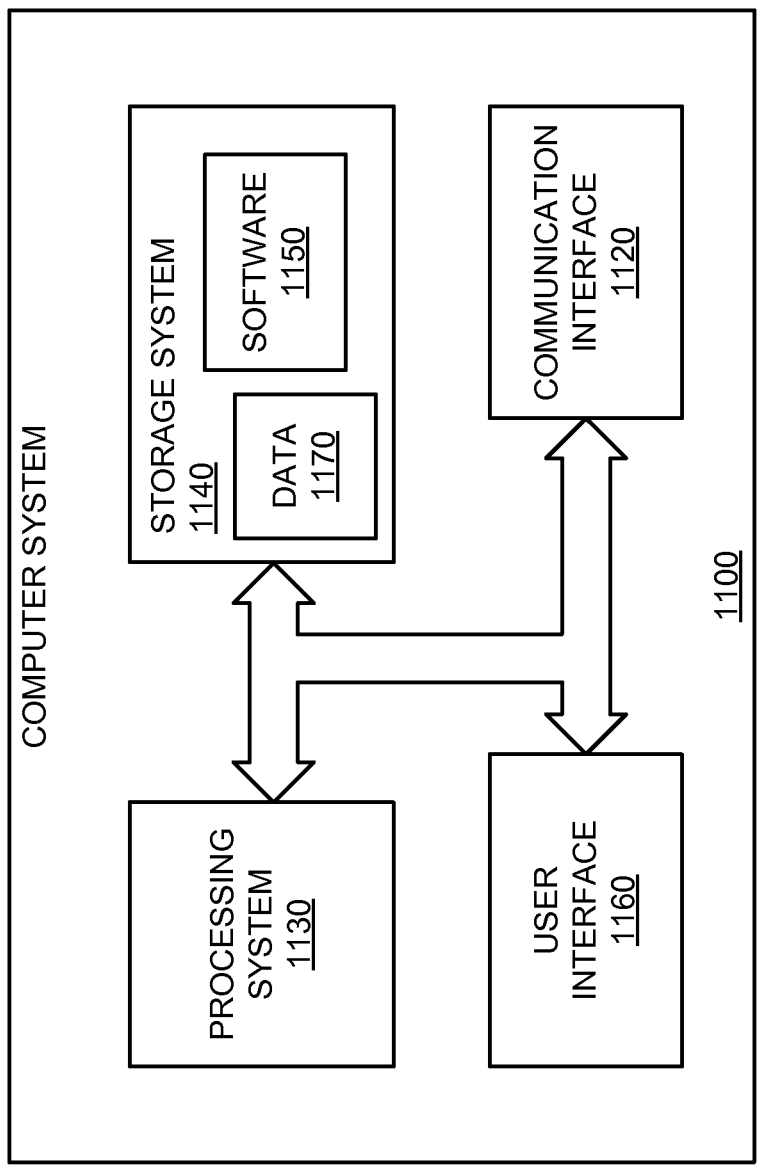
FIG. 11 illustrates a block diagram of a computer system.

FIG. 11 illustrates a block diagram of a computer system. Computer system 1100 includes communication interface 1120, processing system 1130, storage system 1140, and user interface 1160. Processing system 1130 is operatively coupled to storage system 1140. Storage system 1140 stores software 1150 and data 1170. Computer system 1100 may include memory system 100. Processing system 1130 is operatively coupled to communication interface 1120 and user interface 1160. Computer system 1100 may comprise a programmed general-purpose computer. Computer system 1100 may include a microprocessor. Computer system 1100 may comprise programmable or special purpose circuitry. Computer system 1100 may be distributed among multiple devices, processors, storage, and/or interfaces that together comprise elements 1120-1170.

Communication interface 1120 may comprise a network interface, modem, port, bus, link, transceiver, or other communication device. Communication interface 1120 may be distributed among multiple communication devices. Processing system 1130 may comprise a microprocessor, microcontroller, logic circuit, or other processing device. Processing system 1130 may be distributed among multiple processing devices. User interface 1160 may comprise a keyboard, mouse, voice recognition interface, microphone and speakers, graphical display, touch screen, or other type of user interface device. User interface 1160 may be distributed among multiple interface devices. Storage system 1140 may comprise a disk, tape, integrated circuit, RAM, ROM, EEPROM, flash memory, network storage, server, or other memory function. Storage system 1140 may include computer readable medium. Storage system 1140 may be distributed among multiple memory devices.

Processing system 1130 retrieves and executes software 1150 from storage system 1140. Processing system 1130 may retrieve and store data 1170. Processing system 1130 may also retrieve and store data via communication interface 1120. Processing system 1130 may create or modify software 1150 or data 1170 to achieve a tangible result. Processing system 1130 may control communication interface 1120 or user interface 1160 to achieve a tangible result. Processing system 1130 may retrieve and execute remotely stored software via communication interface 1120.

Software 1150 and remotely stored software may comprise an operating system, utilities, drivers, networking software, and other software typically executed by a computer system. Software 1150 may comprise an application program, applet, firmware, or other form of machine-readable processing instructions typically executed by a computer system. When executed by processing system 1130, software 1150 or remotely stored software may direct computer system 1100 to operate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A receiver circuit, comprising:
    a first adjustable impedance circuit to provide a first variable impedance in response to an input to the first adjustable impedance circuit;
    a second adjustable impedance circuit to provide a second variable impedance in response to the input, the first variable impedance and the second variable impedance determining a common-mode voltage presented by the receiver circuit to a differential signal pair;
    an adjustable termination impedance connected between the differential signal pair; and,
    a feedback circuit that, based on an input voltage, sets the input to determine the common-mode voltage presented by the receiver.

2. The receiver circuit of claim 1, wherein the input voltage is to approximate a common-mode voltage presented by a transmitter circuit of the differential signal pair.

3. The receiver circuit of claim 1, wherein the input voltage is based on a reference voltage associated with a transmitter circuit.

4. The receiver circuit of claim 1, wherein the input voltage is based on a supply voltage associated with a transmitter circuit.

5. The receiver circuit of claim 1, wherein the input voltage is based on a second common-mode voltage received from a transmitter circuit.

6. The receiver circuit of claim 1,
    wherein the adjustable termination impedance includes a first adjustable impedance and a second adjustable impedance, the first adjustable impedance and a second adjustable impedance connected in series between the differential signal pair, a series node connected to both the first impedance and the second impedance to have a node voltage, the node voltage corresponding to the common-mode voltage presented by the receiver.

7. The receiver circuit of claim 6, further comprising a current mirror receiving a variable current and supplying a pair of currents based on the variable current to the first adjustable impedance circuit and the second adjustable impedance circuit, respectively.

8. A receiver circuit, comprising:
    a first adjustable impedance circuit to provide a first variable impedance in response to an input to the first adjustable impedance circuit;
    a second adjustable impedance circuit to provide a second variable impedance in response to the input, the first variable impedance and the second variable impedance determining a common-mode voltage presented by the receiver circuit to a differential signal pair; and,
    a feedback circuit that, based on an input voltage, sets the input to determine the common-mode voltage presented by the receiver, wherein the input voltage is based on a second common-mode voltage received from a transmitter circuit.

9. A receiver circuit, comprising:
    a first adjustable impedance circuit to provide a first variable impedance in response to an input to the first adjustable impedance circuit;
    a second adjustable impedance circuit to provide a second variable impedance in response to the input, the first variable impedance and the second variable impedance determining a common-mode voltage presented by the receiver circuit to a differential signal pair;

a feedback circuit that, based on an input voltage, sets the input to determine the common-mode voltage presented by the receiver;

a pair of termination impedances coupled to the differential signal pair, the pair of termination impedances adjustable to provide a termination impedance for the differential signal pair; and, a current mirror receiving a variable current and supplying a pair of currents based on the variable current to the first adjustable impedance circuit and the second adjustable impedance circuit, respectively.

10. The receiver circuit of claim 9, wherein the input voltage is to approximate a common-mode voltage presented by a transmitter circuit of the differential signal pair.

11. The receiver circuit of claim 9, wherein the input voltage is based on a reference voltage associated with a transmitter circuit.

12. The receiver circuit of claim 9, wherein the input voltage is based on a supply voltage associated with a transmitter circuit.

13. The receiver circuit of claim 9, wherein the input voltage is based on a second common-mode voltage received from a transmitter circuit.

14. The receiver circuit of claim 9, wherein the pair of termination impedances includes a first adjustable impedance and a second adjustable impedance, the first adjustable impedance and a second adjustable impedance connected in series between the differential signal pair, a series node connected to both the first impedance and the second impedance to have a node voltage, the node voltage corresponding to the common-mode voltage presented by the receiver.

15. The receiver circuit of claim 8, further comprising:

an adjustable termination impedance connected between the differential signal pair.

16. The receiver circuit of claim 15, wherein the adjustable termination impedance includes a first adjustable impedance and a second adjustable impedance, the first adjustable impedance and a second adjustable impedance connected in series between the differential signal pair, a series node connected to both the first impedance and the second impedance to have a node voltage, the node voltage corresponding to the common-mode voltage presented by the receiver.

\* \* \* \* \*